(12) United States Patent
Lindemann et al.

(10) Patent No.: US 8,964,426 B2
(45) Date of Patent: Feb. 24, 2015

(54) POWER SUPPLY AND METHOD OF OPERATION

(75) Inventors: Stig Alnøe Lindemann, Aarhus N (DK); Mads Kolding Nielsen, Hovedgard (DK)

(73) Assignee: PR Electronics A/S, Ronde (DK)

( * ) Notice: Subject to any disclaimer, the term of this patent is extended or adjusted under 35 U.S.C. 154(b) by 0 days.

(21) Appl. No.: 13/642,869

(22) PCT Filed: Apr. 13, 2011

(86) PCT No.: PCT/DK2011/050121
§ 371 (c)(1),
(2), (4) Date: Dec. 11, 2012

(87) PCT Pub. No.: WO2011/131201
PCT Pub. Date: Oct. 27, 2011

(65) Prior Publication Data
US 2013/0077359 A1    Mar. 28, 2013

(30) Foreign Application Priority Data

Apr. 23, 2010 (DK) .................................. 2010 00360

(51) Int. Cl.
*H02M 1/12* (2006.01)
*H02M 1/44* (2007.01)
*H02M 1/32* (2007.01)
*H04B 15/06* (2006.01)

(52) U.S. Cl.
CPC .... *H02M 1/44* (2013.01); *H02M 1/32* (2013.01); *H04B 15/06* (2013.01)
USPC .............................................. 363/39; 363/49

(58) Field of Classification Search
CPC ......................................................... H02M 1/32
USPC .............. 363/39, 74, 21.01, 49, 21.03, 21.02; 323/266, 299, 901
See application file for complete search history.

(56) References Cited

U.S. PATENT DOCUMENTS

| 6,674,789 B1 | 1/2004 | Fardoun et al. |
| 8,085,106 B2 | 12/2011 | Huda |
| 8,098,505 B1 * | 1/2012 | Choi ............................... 363/89 |
| 2008/0198638 A1 * | 8/2008 | Reinberger et al. ............. 363/74 |

(Continued)

FOREIGN PATENT DOCUMENTS

| CN | 1738189 A | 2/2006 |
| CN | 101505105 A | 8/2009 |
| EP | 1592154 | 11/2005 |

OTHER PUBLICATIONS

Fairchild Semiconductor, "Design and Application Guide for SG6859A," rev. 1.0.0, Feb. 4, 2008.

(Continued)

*Primary Examiner* — Gary L Laxton
*Assistant Examiner* — Trinh Dang
(74) *Attorney, Agent, or Firm* — James Creighton Wray

(57) ABSTRACT

A switched-mode power supply (SMPS) and a method of control thereof is described, wherein the SMPS is operable to apply a spread spectrum modulation to a switching driver signal to reduce EMI in the SMPS. The SMPS is operable to perform voltage and current monitoring in parallel to the spread spectrum modulation to provide variable limit threshold detection and shutdown capabilities for circuit protection.

15 Claims, 12 Drawing Sheets

(56) References Cited

U.S. PATENT DOCUMENTS

2009/0174440 A1 7/2009 Man
2009/0257257 A1* 10/2009 Adragna et al. ............... 363/65

OTHER PUBLICATIONS

Fairchild Semiconductor Corporation, "Design and Application Guide for SG6859A", Apr. 2, 2008.

* cited by examiner

POWER SUPPLY AND METHOD OF OPERATION

This application claims the benefit of Danish Application No. PA 2010 00360 filed Apr. 23, 2010 and PCT/DK2011/050121 filed Apr. 13, 2011, International Publication Number WO 2011/131201, which are hereby incorporated by reference in their entirety as if fully set forth herein.

FIELD OF THE INVENTION

The present invention relates to a power supply and a method of operation thereof, in particular a switched-mode power supply and a method of protecting such a power supply from variations in voltage and current.

BACKGROUND OF THE INVENTION

Switched-mode power supplies (SMPS) are a well-known type of power supply, suitable for taking a standard input power supply (e.g. a mains power supply), performing a conversion operation and providing a desired electrical power output. An SMPS comprises a switching regulator to switch the input to a transformer coupled with a storage element, e.g. a capacitor or inductor. The output voltage can be regulated using the switching frequency, and/or the transformer/capacitor/inductor characteristics.

It is known to apply different techniques to SMPS to improve operation, e.g. to apply spread-spectrum modulation in an effort to reduce electro-magnetic interference (EMI) in the SMPS.

One of the problems with SMPS however is that with some transformers, a rise in system temperature may lead to a degradation in the wire insulation of transformer windings, and possibly leading to a short circuit in the transformer as the insulation may melt between adjacent windings. The high current levels produced by such a short circuit can act to damage electrical components in the system.

Another problem is that voltage fluctuations in the SMPS can result in fluctuations in the SMPS output, which may result in damage to any components connected to the SMPS output or incorrect functionality due to incorrect voltage levels.

It is an object of the invention to provide a power supply and a method of controlling such a power supply which prevents damage to components due to variations in voltage and current.

SUMMARY OF THE INVENTION

Accordingly, there is provided a method of controlling a switched-mode power supply, the power supply comprising a switching circuit for receiving a supply voltage and outputting a switched voltage, and a converter circuit coupled to said switching circuit and driven by said switched voltage to produce a required output voltage, the method comprising the steps of:
  providing a driving signal to said switching circuit to regulate the switching frequency of said switching circuit, and
  applying a spread spectrum modulation to said driving signal to reduce electromagnetic interference in the power supply, wherein the method further comprises the steps of:
monitoring the supply voltage to said switching circuit during operation of said switching circuit, and
  stopping the operation of said switching circuit if said monitored supply voltage falls below an operational voltage threshold value.

As the system is operable to detect errors in the monitored supply voltage and to halt operation of the circuit on detection of such errors, the system operates with a failsafe feature which can prevent damage to circuit components, providing a steady output voltage with reduced EMI.

Preferably, the method further includes a start-up procedure for starting the operation of said switching circuit comprising:
  monitoring the supply voltage to said switching circuit when said switching circuit is not operational, and
  starting said switching circuit when said monitored supply voltage exceeds a start-up voltage threshold value.

By monitoring the start-up voltage before operation, and ensuring that the voltage exceeds a required start-up threshold, the system ensures smooth operation of the SMPS, and a steady output voltage.

Preferably, said start-up voltage threshold value is greater than said operational voltage threshold value.

As the required start-up voltage is greater than the operational voltage threshold, this introduces a hysteresis effect to the voltage supply, and provides a further failsafe feature to the system, ensuring smooth operation.

Preferably, the step of monitoring comprises:
  sampling a plurality of successive supply voltages,
  averaging said plurality of sampled supply voltages to provide an averaged supply voltage, and
  comparing the averaged supply voltage to a voltage threshold value.

As the voltages are averaged when comparing to a threshold, intermittent temporary errors in supply or detection are filtered out of the failsafe system, providing for more reliable operation of the device.

Preferably, the method further comprises the steps of:
  monitoring current flow through said switching circuit during operation of said switching circuit, and
  stopping operation of said switching circuit if said monitored current flow exceeds a flow current threshold value.

By monitoring the current flow, the system is operable to prevent damage to system components, e.g. transformer wiring, due to high current levels, e.g. from avalanche effects caused by increasing system temperature/increasing current.

Preferably, said power supply comprises a resistor provided in series with said switching circuit, and wherein said current monitoring comprises measuring the current flow through said resistor.

Preferably, said step of current monitoring comprises:
  sampling a plurality of successive current flow values,
  averaging said plurality of sampled current flow values to provide a first averaged current flow, and
  comparing said first averaged current flow value to a current flow threshold value.

Preferably, said step of comparing comprises:
  recording a plurality of successive averaged current flow values, and wherein said step of stopping operation of said switching circuit is performed when a predefined number of said plurality of averaged values exceeds said current flow threshold value.

By monitoring a series of averaged current values, a sliding window filtering of the monitored current is effectively performed, acting to eliminate errors from incorrect detection or minor spikes in detected current flow.

Preferably, at least one of said steps of monitoring the operational voltage supply and monitoring current flow are performed in parallel to said step of applying a spread spectrum modulation to said driving signal.

By performing the steps in parallel, the system is particularly suitable for operation using a microprocessor having restricted processing bandwidth.

Preferably, said step of applying a spread spectrum modulation to said driving signal comprises the steps of:
 (i) generating a first pseudo random number;
 (ii) selecting a frequency value based on said pseudo random number;
 (iii) providing a driving signal having said selected frequency value;
 (iv) generating a new pseudo random number; and
 (v) repeating steps (ii)-(iv) in a main loop cycle for the duration of operation of the switching circuit.

Preferably, said steps (ii) and (iii) are repeated for a plurality of iterations within said main loop cycle.

Preferably, said pseudo random number is a binary number, and wherein step (ii) comprises selecting between a first frequency value and a second frequency value based on an accumulation operation performed on at least a portion of said binary pseudo random number.

By selecting different switching frequencies based on the accumulation operation, the invention provides additional granularity of modulation for each pseudo random number generated.

Preferably, at least one of said steps of monitoring the operational voltage supply and monitoring current flow are performed in parallel to said steps (ii) and (iii) of said main loop cycle.

Preferably, said step of current monitoring is performed after a predefined number of successive main loop cycles of operational voltage monitoring.

Preferably, said power supply comprises a pseudo random generator, and wherein the method further comprises the steps of:
 detecting if the pseudo random generator enters a deadlock condition; and resetting the pseudo random generator if a deadlock condition is detected.

There is also provided a switched-mode power supply comprising:
 a switching circuit for receiving a supply voltage and outputting a switched voltage;
 a converter circuit coupled to said switching circuit and driven by said switched voltage to produce a required output voltage; and
 a controller coupled to said switching circuit, said controller operable to perform any of the method steps described.

The invention also provides a method for operating semiconductor switches by Pulse Width Modulation (PWM) in a switch mode power supply is performed by at least the following steps:
 a: a digital controller generates switching signals in form of carrier frequencies for semiconductor switches in a time periods where the semiconductor switch is conducting,
 b: in the digital controller, a selection of carrier frequencies is performed in a table of random frequencies,
 c: the digital processor performs a voltage measurement by an analogue digital converter, which digital converter transmits digital voltage values to the digital processor
 d: the digital controller generates carrier frequencies by shifting in the time domain between a discrete set of carrier frequencies,
 e: the digital controller performs continuous scaling of the time period to fit each carrier frequency.

DESCRIPTION OF THE INVENTION

Embodiments of the invention will now be described, by way of example only, with reference to the accompanying drawings, in which.

Figure 1:
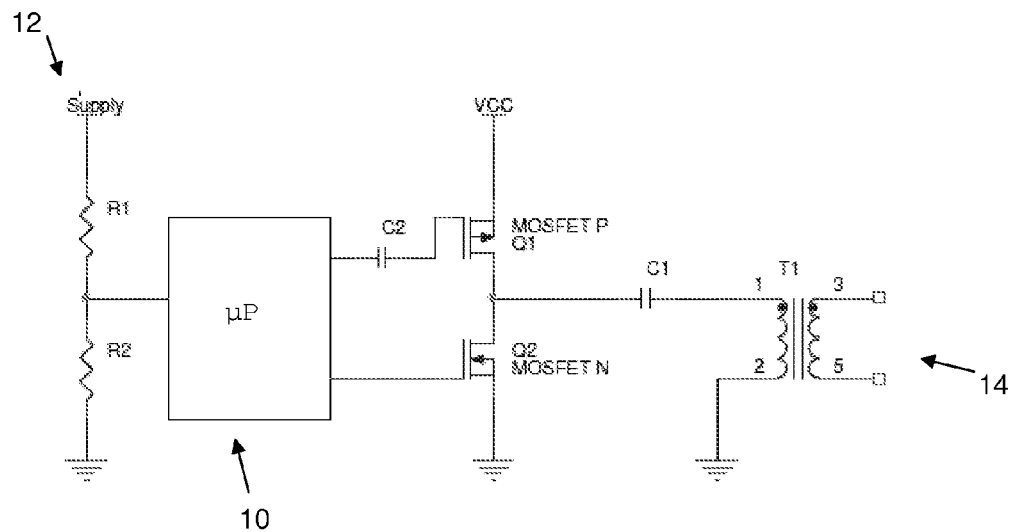
FIG. 1 is a circuit diagram of a SMPS according to an aspect of the invention.

FIG. 1 shows a circuit for a switched-mode power supply (SMPS) of the invention. The circuit comprises a microprocessor 10 coupled to a supply voltage 12 via a voltage divider comprising resistors R1 and R2. The circuit further comprises a switching portion, in this embodiment of a half H-bridge type, comprising a pair of MOSFETs Q1 (P-type MOSFET) and Q2 (N-type MOSFET), coupled to Vcc, and driven by outputs of the microprocessor 10. (Appropriate circuitry is also provided for correct operation of the system components, e.g. capacitor C2 provided between the microprocessor 10 output and the gate of the P-type MOSFET Q1). The circuit further comprises a converter circuit comprising a transformer T1 and capacitor C1, with the output of the switching circuit coupled to said transformer T1 via said capacitor C1. The output of transformer T1 across terminal 14 is dependent on the switching frequency of the MOSFETs Q1 and Q2 of the switching circuit, which can be selected to provide the desired voltage level at output terminal 14.

Figure 2:
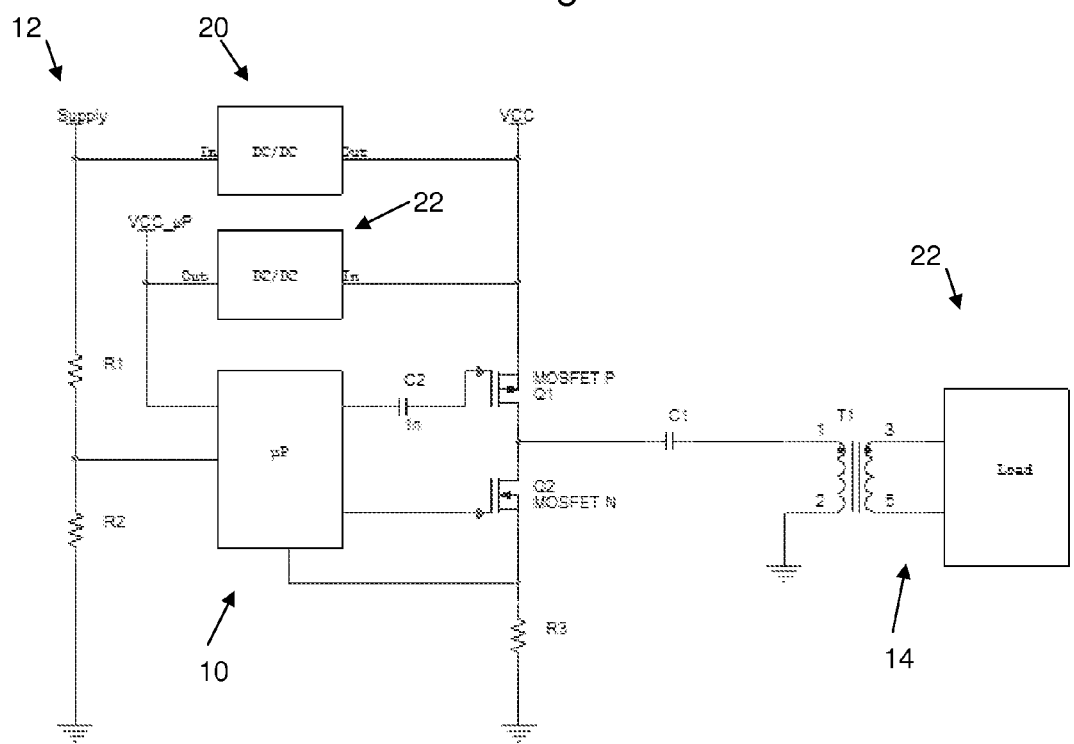
FIG. 2 is a circuit diagram of an enhancement of the circuit of FIG. 1.

An enhanced version of the circuit can be seen in FIG. 2, having similar components and corresponding reference numerals to the circuit of FIG. 1. In FIG. 2, the circuit is connected to external supply voltage 12, which is converted using a first DC/DC converter 20 to provide Vcc. Vcc is subsequently converted using a second DC/DC converter 22 to provide Vcc uP (Vcc suitable for use by the microprocessor 10).

FIG. 2 further includes resistor R3 coupled in series with the MOSFETs Q1 and Q2, between the MOSFETs and ground, to enable the microprocessor 10 to monitor the current flow through the MOSFETs Q1 and Q2. The output 14 of the circuit may be connected to an electrical load 22.

Figure 3:
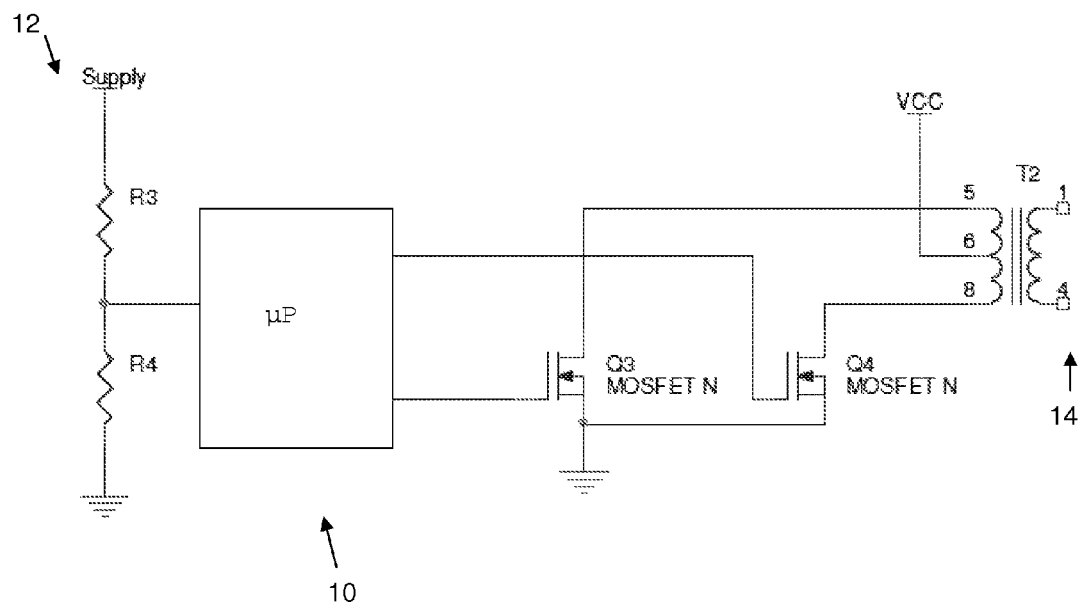
FIGS. 3 and 4 illustrate alternative circuit diagrams to the circuit of FIG. 1.
Figure 4:
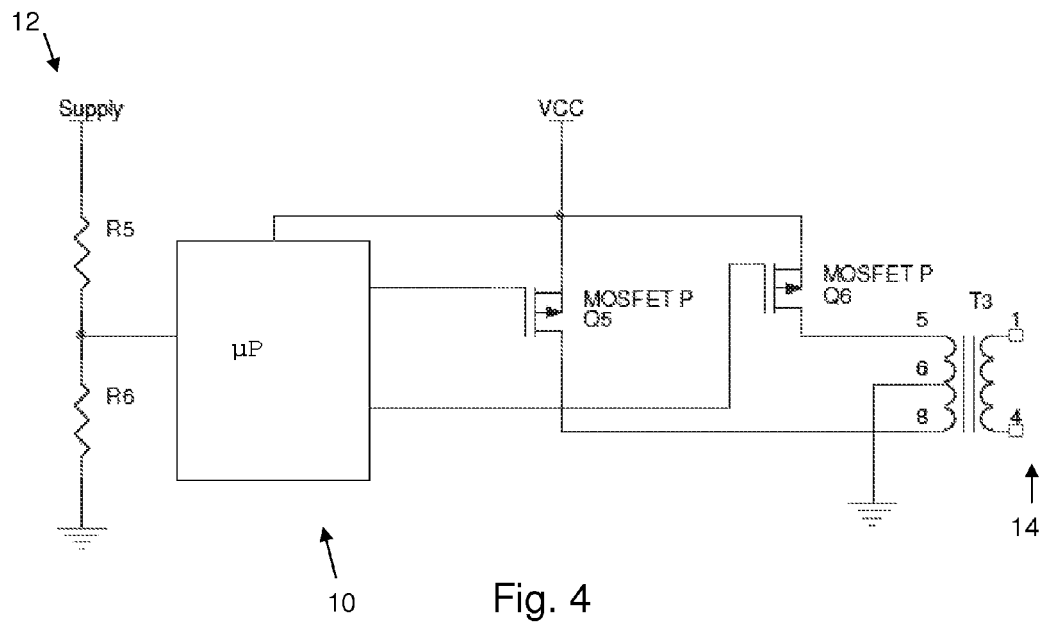

Further examples of possible switching circuits which may be used in the system of the invention may be a push-pull converter, e.g. using N-type MOSFETs Q3 and Q4 (as illustrated in FIG. 3), or using P-type MOSFETs Q5 and Q6 (as illustrated in FIG. 4).

Figure 5:
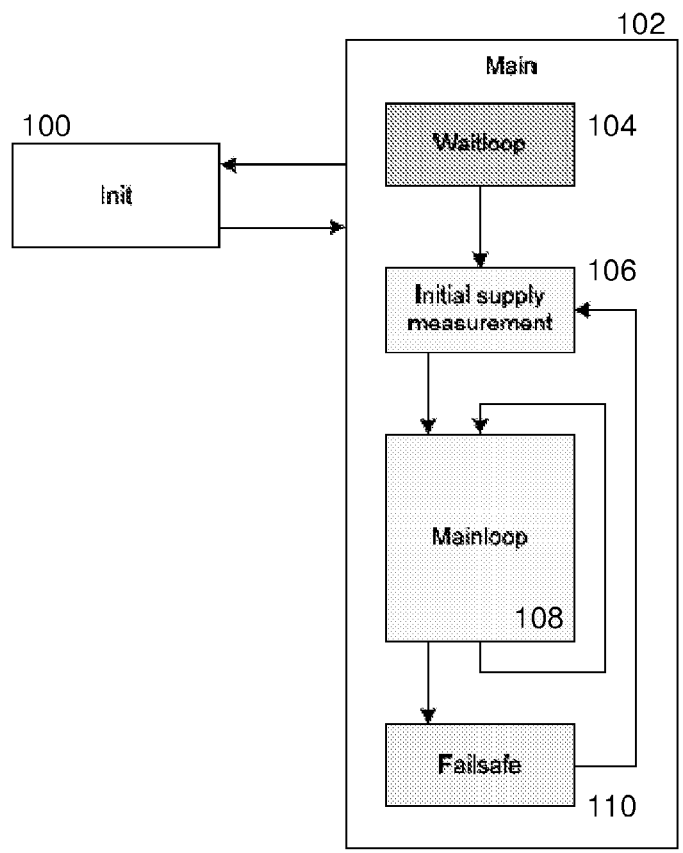
FIG. 5 is a simple process diagram of a general control method for the circuit of FIGS. 1 and 2.

With reference to FIG. 5, a general process diagram of the control process for the circuit of the invention is illustrated. Upon starting the SMPS, the system enters initialisation procedure Init 100. The Init stage 100 may comprise any initialisation operations required for the circuit and the microprocessor 10 used, e.g. performs initialisation of registers; clear all general purpose registers, sets those general purpose registers that needs to be initialised to something different than zero.

Once initialisation is complete, the system proceeds to the main operation 102 of the device. The system enters a wait loop 104, to allow the voltages in the system to rise up levels before continuing program execution. Then, the system performs an initial supply measurement 106 (described in greater detail below), to determine that a stable supply voltage is present.

Once the system passes the initial supply measurement step, the system proceeds to the main operational loop, Mainloop 108. Here, the system is allowed to operate in a continuous loop, producing the desired output voltage for as long as the operational conditions are satisfied. If such conditions are broken, the system is operable to enter a failsafe procedure 110, which is operable to sets the output for the driving transistors to a known state, and returns the system to step 106 to perform the initial supply measurement again, before returning to the standard operating loop 108.

Figure 6:
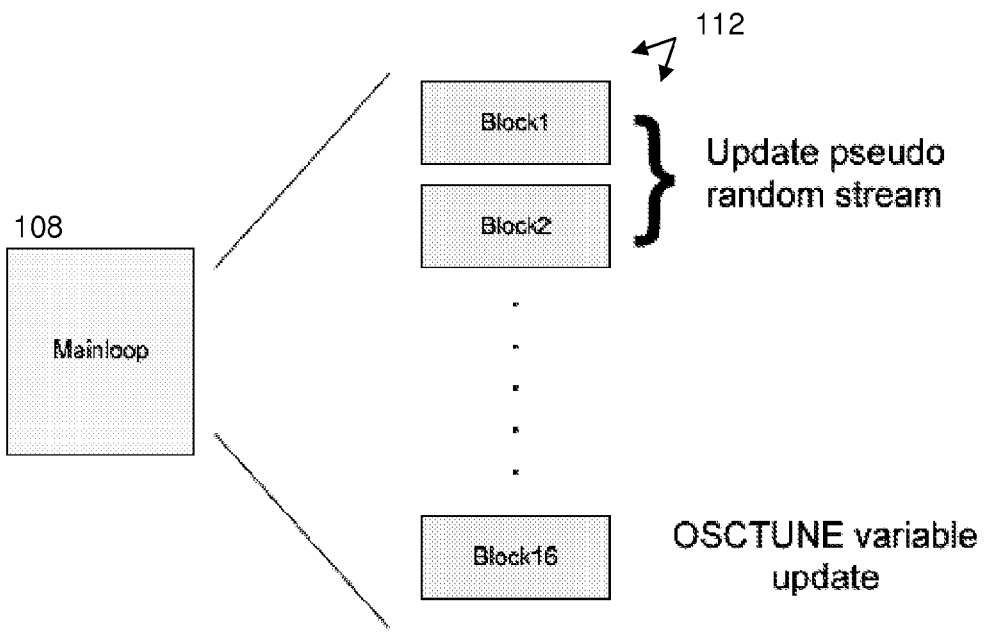
FIG. 6 is a simple process diagram for the Mainloop process of FIG. 5.

With reference to FIG. 6, within the Mainloop 108 procedure, a series of looped steps or blocks 112 are performed. Within these steps 112 the spread spectrum modulation of the switching of the circuit is performed, in parallel with operational voltage monitoring and/or current flow monitoring. The spread spectrum modulation is described in greater detail below. In the embodiment shown in FIG. 6, 16 separate steps or blocks are performed for each iteration of Mainloop 108, but it will be understood that alternative configurations and/or numbers of blocks per iteration of Mainloop may be used.

Figure 7:
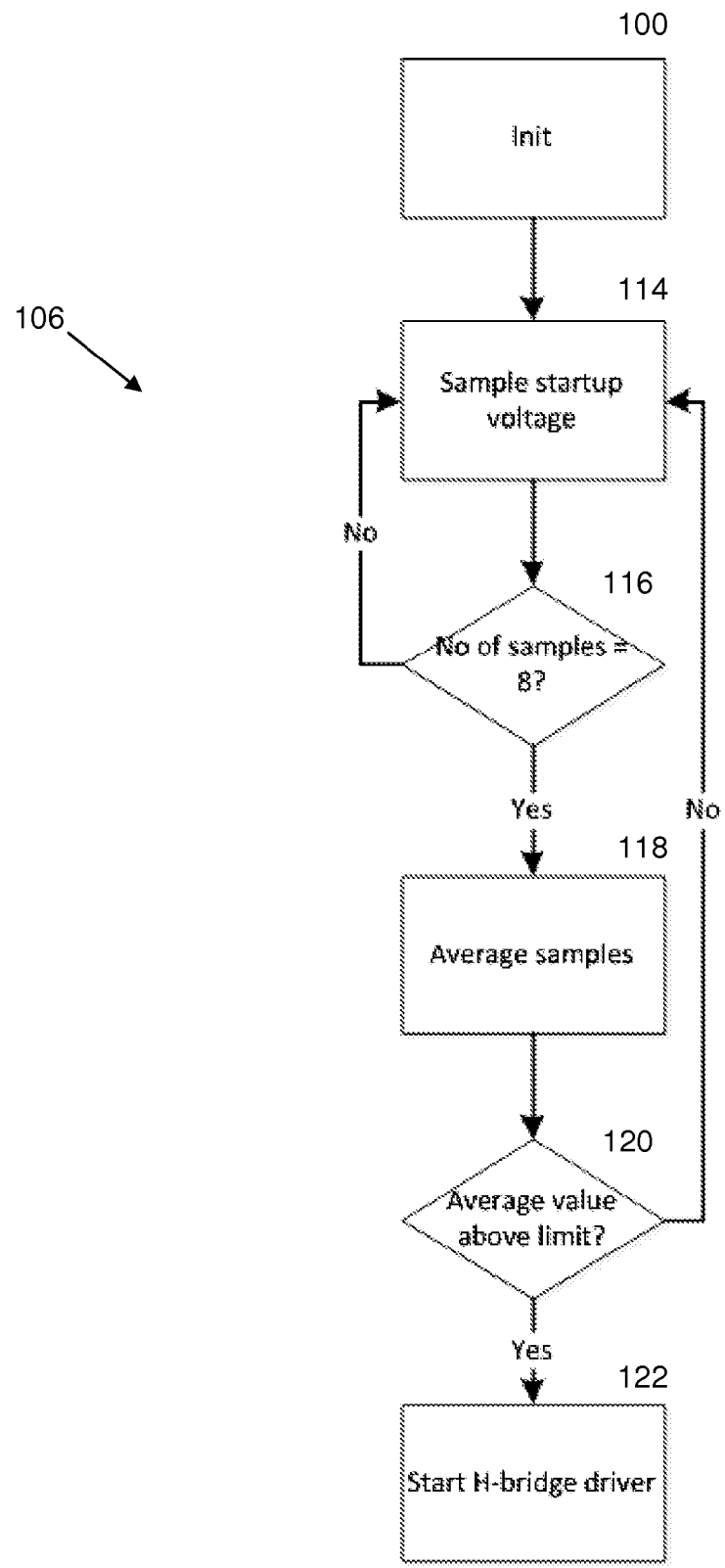
FIG. 7 is a process diagram for a start-up procedure of the process of FIG. 5.

In FIG. 7, the start up procedure of the system including the steps of the initial supply measurement step 106 are detailed. The initialisation step 100 commences the start up procedure, wherein the microprocessor 10 samples the start up voltage (step 114) by measuring the external supply voltage 12. The microprocessor 10 is maintained in a sampling loop until a suitable number of separate sample voltages have been measured and stored in the microprocessor 10 (step 116—in this case, 8 separate samples).

Once the pre-defined number of samples have been recorded, the microprocessor 10 finds the average voltage level of the external supply voltage 12 (step 118), and compares this average to a pre-defined start-up voltage threshold (step 120). If the average sampled start-up voltage is greater than the threshold, the switching circuit can be safely started (step 122—in this case the portion of the microprocessor acting as the driver for the half H-bridge circuit can be started). Once the switching circuit is started, the control process moves to the Mainloop operational stage 108.

Figure 8:
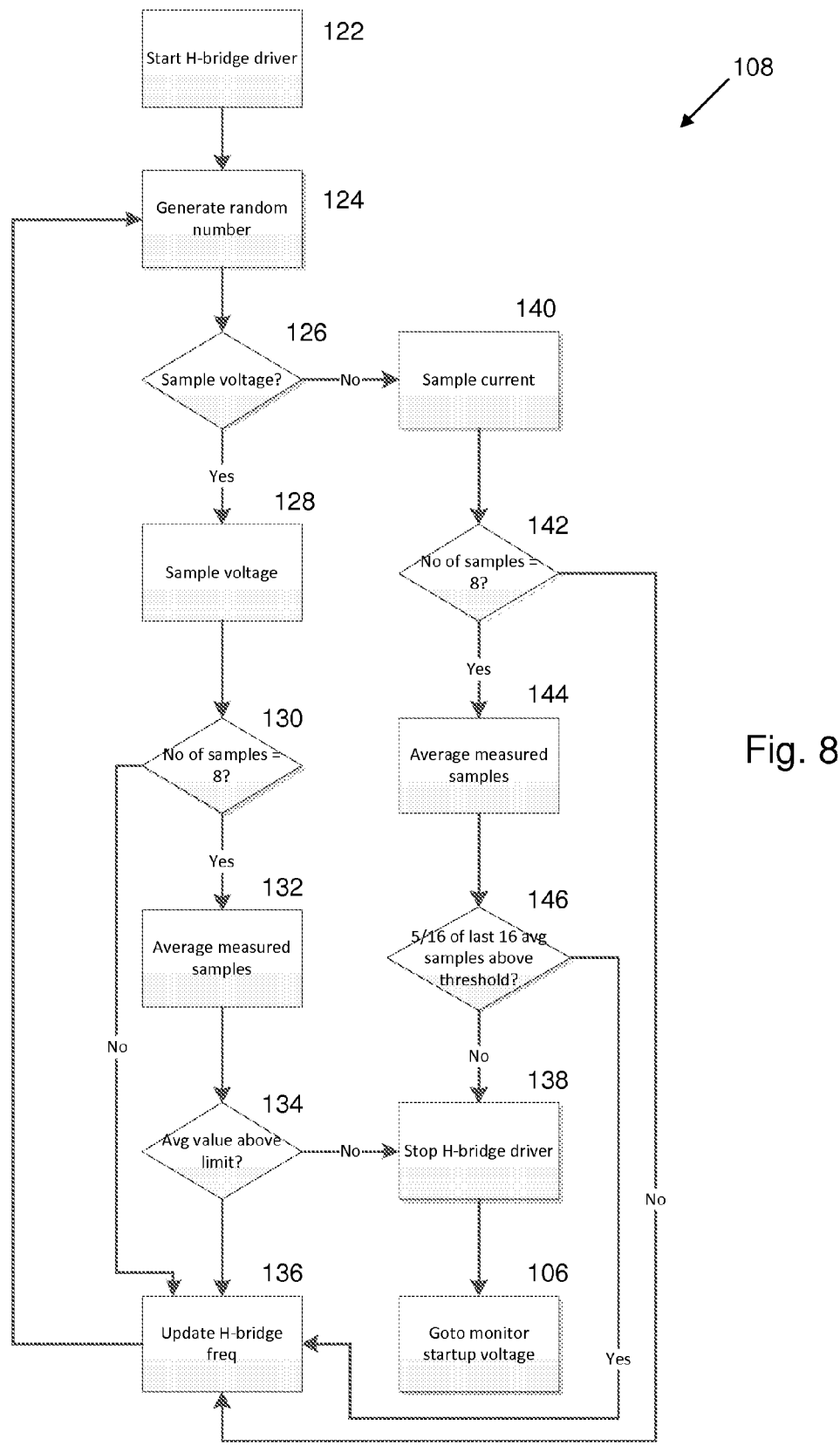
FIG. 8 is a process diagram for an operational procedure of the process of FIG. 5.

In FIG. 8, the steps of the Mainloop operational stage 108 are detailed. Once the half H-bridge driver is started (step 122 from FIG. 7), a pseudo random number generator is used to generate a pseudo random number (step 124). This is used in the spread spectrum modulation to select a particular frequency for the driving signal of the switching circuit (described in greater detail below). In parallel with the spread spectrum modulation performed in Mainloop 108, the system is operable to monitor the voltage and/or current of the system, to ensure satisfactory operation.

Preferably, the system is operable to perform one of either a voltage or current monitoring operation for each cycle of Mainloop 108. As the pseudo random number is generated, the system is operable to determine whether it should sample either the voltage or the current for the present iteration of Mainloop (step 126). Preferably, the system initially performs a voltage monitoring operation, and is operable to perform a current monitoring operation once a pre-defined number of voltage monitoring operations have been performed or a pre-defined number of iterations of Mainloop 108 have been performed.

If voltage is to be monitored, the microprocessor 10 proceeds to sample the external supply voltage 12 (step 128), similar to as done in the start-up procedure of FIG. 7. If the number of recorded voltage samples does not reach a pre-defined level (step 130), the process acts to update the switching frequency of the half H-bridge driver (step 136), and loops back to generate a new pseudo random number (step 124).

Once a pre-defined number of samples have been recorded (in this case, 8 samples), the microprocessor 10 finds the average voltage level of the external supply voltage 12 (step 132), and compares this average to a pre-defined operational voltage threshold (step 134). If the average sampled operational voltage is greater than the threshold, the operating conditions of the system are acceptable, and operation can continue. Accordingly, the half H-bridge driver is updated with a new frequency (step 136), and again looped back to the generation of a new pseudo random number (step 124).

If the averaged operational voltage does not exceed the threshold (step 134), there is a problem with the voltage supply, and the half H-bridge driver is stopped (step 138). When this occurs, the Mainloop 108 cycle is broken, and the system returns to monitoring the start-up voltage (step 106).

As Mainloop acts to continually monitor the operational voltage of the circuit, it can be ensured that a steady output voltage is produced by the SMPS.

Figure 9:
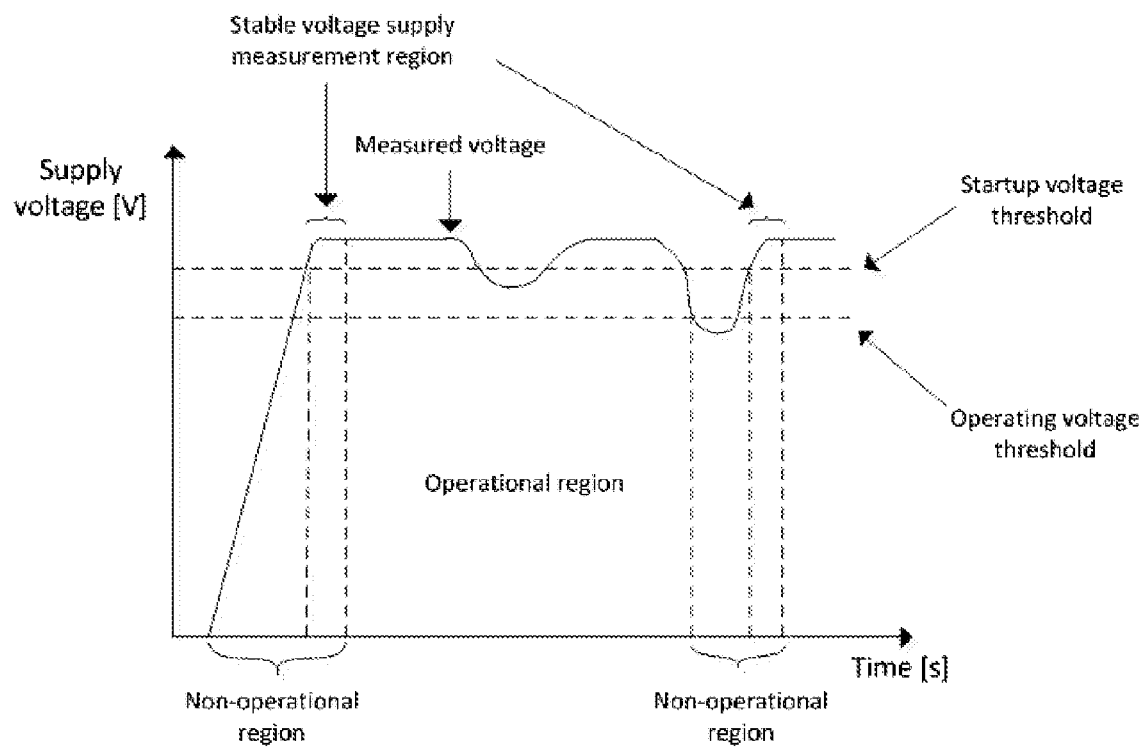
FIG. 9 is a plot of the voltage level during a sample operation of the circuit of the invention.

Preferably, the start-up voltage threshold is greater than the operational voltage threshold, as this introduces a hysteresis effect into the system. With reference to FIG. 9, a graph is shown of a sample measured average voltage signal, and the effect on the operation of the SMPS of the invention. Initially the supply voltage is applied in a step function, resulting in the measured average voltage ramping up. The circuit at this stage in the start-up loop 106. The measured average voltage eventually exceeds the start-up voltage threshold, at which point the SMPS is started, and the control process switches to the Mainloop process 108. As the operation continues, minor fluctuations around the start-up threshold voltage do not impact on circuit operation, until the average operational voltage falls below the operational voltage threshold, at which point the circuit is stopped, and the control system returns to the start-up loop again 106, until the measured average voltage returns again to above the start-up threshold level, and returns to Mainloop 108 operation.

Returning to FIG. 8, if the system has performed a number of iterations of voltage monitoring in a row, the system is operable to select a current monitoring operation (step 126). Here, the microcontroller 10 samples the current flowing through the resistor R3 (step 140). Once the number of samples of current flow level have reached a pre-defined number (step 142—in this case 8), the system is operable to average the sampled current flow values (step 144). At this point, the average current flow value is stored in memory, and the microcontroller is operable to apply a sliding window operation to the stored average current flow values, wherein the microcontroller 10 compared if a predefined number of the stored average current flow values within the window exceed a predefined current flow threshold (step 146).

If the predefined number of recorded values are above the threshold, this may indicate that there is a problem within the circuit, e.g. an excess of current flowing through the converter circuit. Excessive current flow through the transformer and varying temperatures can potentially weaken the insulation of the windings in the transformer with a short circuit as a result. In this case, the half H-bridge driver is stopped (step 138), and the circuit returned to the start-up monitoring procedure (step 106).

Conversely, if a predefined number of recorded values are below the threshold, the circuit is operating at an acceptable current level, and the Mainloop 108 cycle continues by updating the half H-bridge driver frequency (step 136) and returning to the step of generating a new pseudo random number (step 124).

In the embodiment shown in FIG. 8, the sliding window is operable to monitor the last 16 averaged current flow values, and step 146 is operable to check if 5 out of said 16 values are above the current flow threshold value.

Figure 10:
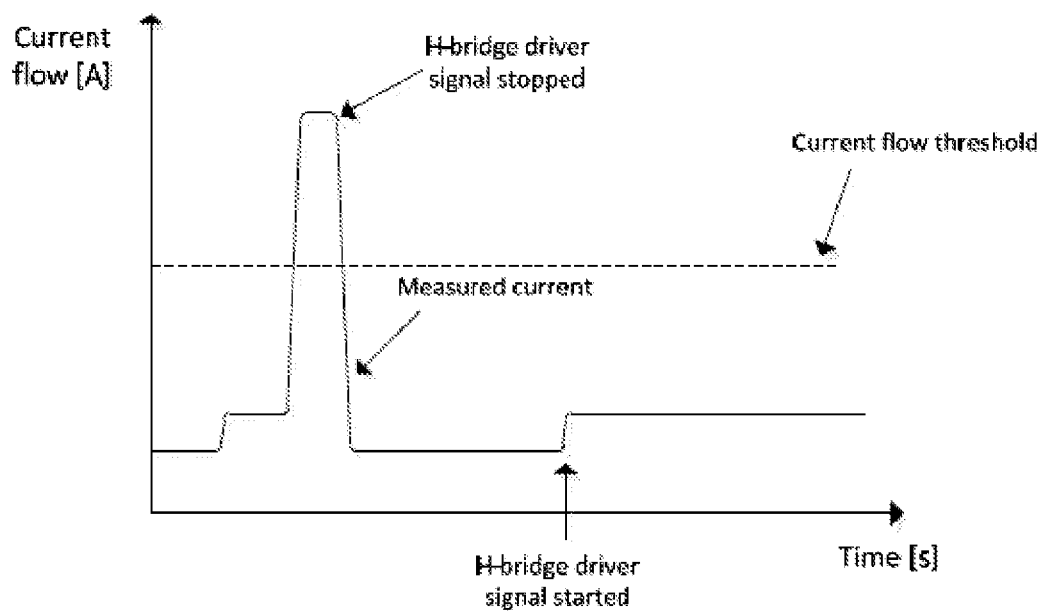
FIG. 10 is a plot of the current flow level during a sample operation of the circuit of the invention.

FIG. 10 illustrates the operation of the SMPS for a sample measured current flow. As can be seen from FIG. 10, the operation of the half H-bridge driver (and consequently the entire SMPS) is stopped if the average measured current flow in the system exceeds the threshold for a period of time (due to the use of the sliding window).

A description of the operation of the processes of FIGS. 7 and 8 in pseudo code is as follows:

Startup sequence (steps 114,116,118,120,122)
LABEL StartUp
Sample startup voltage
IF 8 successive samples
THEN average the 8 samples and verify against threshold
  IF below limit
  THEN GOTO StartUp
  ELSE GOTO Voltage—loop
Voltage loop sequence (steps 124,126,128,130,132,134,136,138)
LABEL Voltage—loop
The random generator updates its bit sequence
The voltage is sampled
IF 8 successive samples
THEN average the 8 samples and verify against threshold
  IF below limit
  THEN stop the half H-bridge driver and GOTO measure startup voltage
  IF voltage sampled 48 times
  THEN GOTO Current
  ELSE continue
ELSE continue
LABEL Voltage; Preload new half H-bridge driver frequency
GOTO Voltage—loop
Current loop sequence (steps 124,126,140,142,146,138,136)
LABEL Current—loop
The random generator updates its bit sequence
The current is sampled
IF 8 successive samples
THEN average the 8 samples and verify against threshold
  IF 5/16 of the last 16 averaged samples are above threshold
  THEN stop the half H-bridge driver and GOTO measure startup voltage
  ELSE GOTO Voltage
ELSE continue
LABEL Current; Preload new half H-bridge driver frequency
GOTO Current—loop
Threshold Voltage As an example of how the threshold voltages may be selected for the system, in one embodiment, an 8 bit microcontroller is used.

If the resolution of the A/D converter that measures the supply voltage is ten bits, the eight most significant bits are selected from the A/D converter for the system of the invention. The voltage divider for the main supply, given by a resistor network, is calculated at 30000/1030000=0.029126 ohms, and the startup voltage limit is 16 volts. If the converter reference voltage of the microcontroller 10 is 3.3 volts, the threshold value in counts is defined as:

$$\frac{16V(0.029126)}{3.3V} 1024 \text{ counts} = 144.6 \text{ counts}$$

When only using the 8 most significant bits the threshold value is 144.6/4=36.15 which is rounded to 36 counts. For verification, the 36 counts are converted back to the main supply voltage, and provides the following value:

$$\frac{36 \text{ counts}(4)(0.029126)(3.3V)}{1024 \text{ counts}} = 15.933V$$

Accordingly, the threshold voltage when the system is up and running is 15 volts. By using the same formula as above the threshold in counts can be calculated:

$$\frac{15V(0.029126)}{3.3V} 1024 \text{ counts} = 135.57 \text{ counts}$$

When this is divided by 4 and rounded provides 34. The actual threshold voltage can now be calculated:

$$\frac{34 \text{ counts}(4)(0.029126)(3.3V)}{1024 \text{ counts}} = 15.048V$$

The supply voltage sampling scheme depends on the operating mode. One mode is during start-up. Here, the supply voltage is continuously sampled until the sampled voltage is above the defined threshold limit. The other one is when the system is in its operating mode. Here the system follows a scheme of 16 blocks before it restarts is cycle. During this 16 block cycle the supply voltage is sampled one time and is averaged for each sample.

Switching Circuit Driver Signals

In order to drive the MOSFETs two synchronised pulse trains needs to be generated. This can be done by using dedicated circuits for performing this purpose, or, as in the present embodiment, a microprocessor (such as a PIC) can be programmed and used for this purpose. Preferably the microprocessor is equipped with an in-built AD converter, such that the supply voltage to the system and the current draw can be monitored as well.

Figure 11:
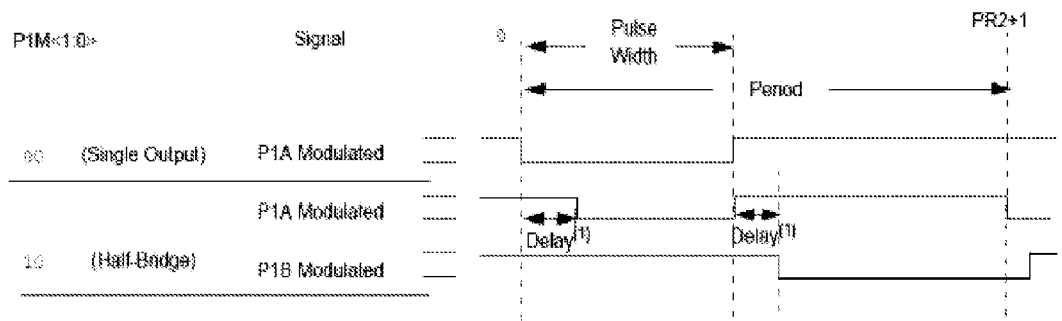
FIG. 11 is an illustrative diagram of the Pulse Width Modulation (PWM) operation of a sample microprocessor.

To generate pulses the pulse width modulation (PWM) output from the PIC requires two PWM outputs for driving the half H-bridge, as shown in FIG. 11. Thus, using two standard PWM outputs requires that the firmware shall coordinate when the PWM outputs shall generate a pulse and a pause. To overcome this some PIC microprocessors have a built-in mechanism for synchronizing two PWM outputs.

Spread Spectrum Modulation

Spread Spectrum Modulation acts to lower the power of some frequencies in a power supply, and is achieved by spreading the power out over a larger number of frequencies.

Figure 12:
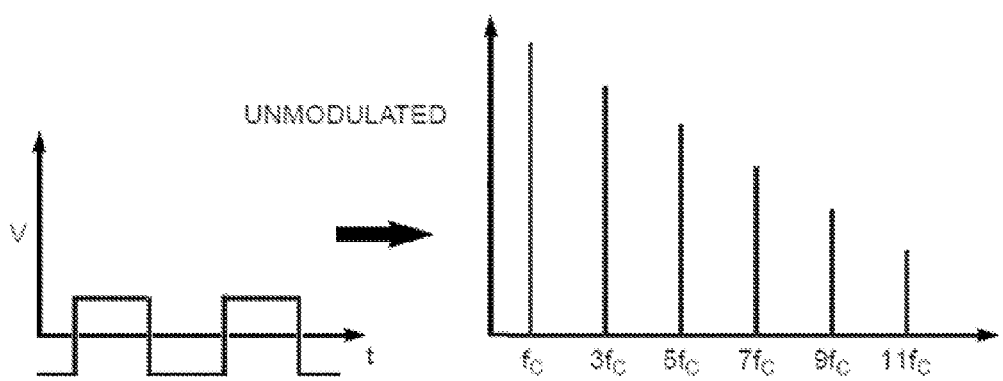
FIG. 12 shows an unmodulated square-wave switching signal, and the corresponding frequency plot.

FIG. 12 illustrates a basic switching scheme used in a regular power supply, consisting of a single square wave that generates a spectrum plot as shown in FIG. 12, where all the harmonics are present with a decreasing energy level.

The spectrum consists of peaks at fc, 3fc, 5fc, etc., and each of these frequencies can be seen as an interference (in the form of electromagnetic interference—EMI) which has to be minimised.

Figure 13:
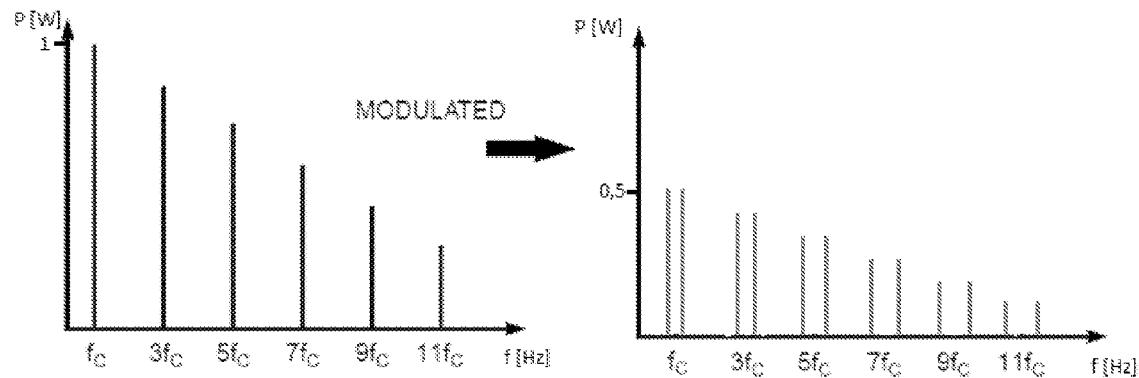
FIG. 13 shows the frequency plot for the switching signal of FIG. 12, and a frequency plot for an identical switching signal using spread spectrum modulation.

By modulating the frequency of the switching, the corresponding spectrum will show that energy levels are decreased (FIG. 13). Still all the harmonics are present but their energy has been spread over a range of frequencies, and thus the energy levels due to these harmonics are decreased.

In the example of FIG. 13, only two frequencies are used to divide the power. Accordingly, utilising a large number (n) of frequencies evenly spaced between a higher and a lower limit (fh and fl) leads to even lower EMI. Proper selection of modulation bandwidth limits (fl and fh) must be done in order to avoid overlap between modulated higher harmonics.

The relationship between a higher harmonic (n) and the associated spread spectrum bandwidth $BW_n$ can be approximated by:

$$BW_n = n(fh - fl)$$

Figure 14:
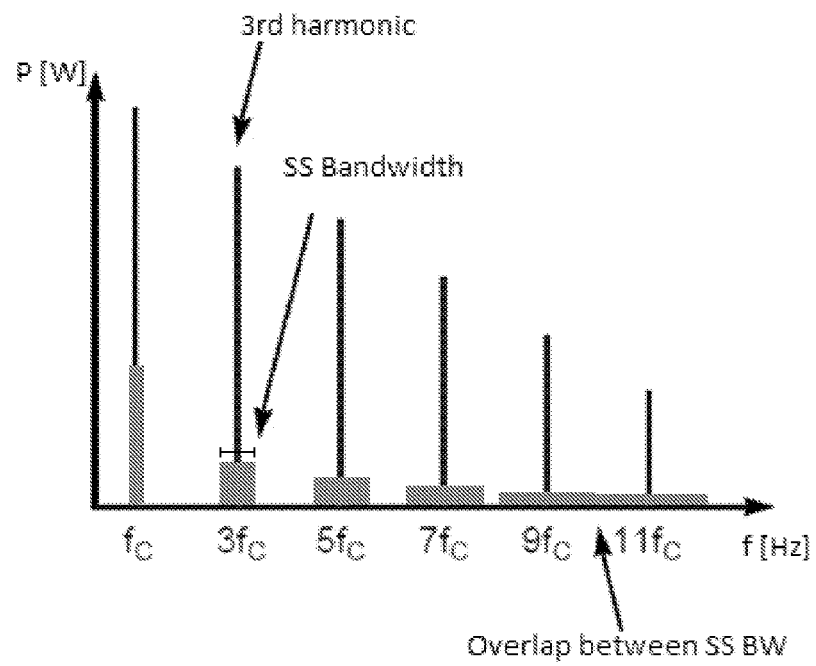
FIG. 14 illustrates the bandwidth widening effect of spread spectrum modulation.

The widening effect of the spread spectrum bandwidth is illustrated in FIG. 14, which shows that overlap between signals is unavoidable, but can be allowed as long as the higher harmonics which overlap carry close to zero energy.

Figure 15:
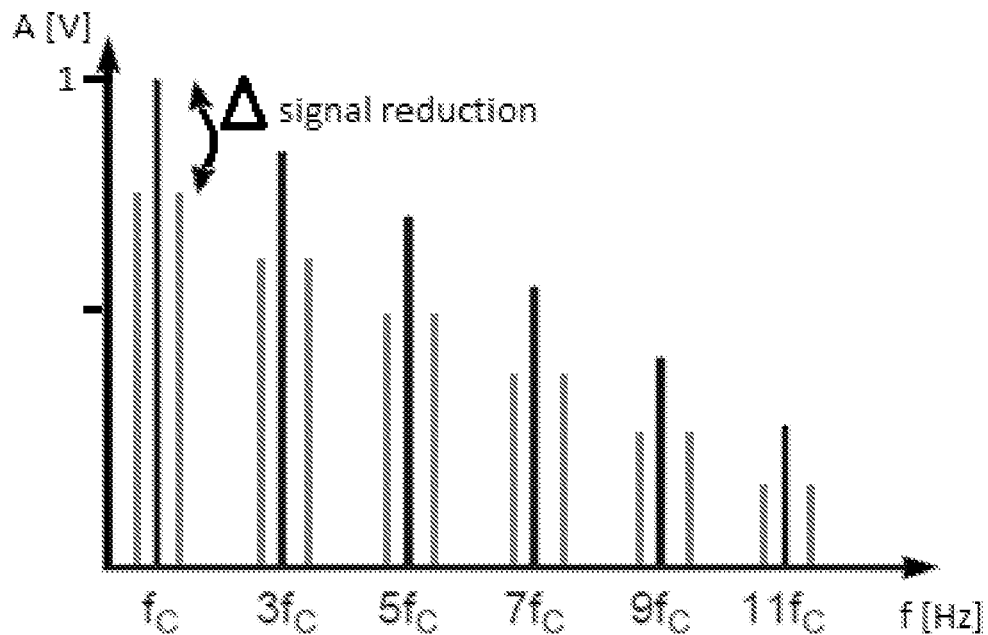
FIG. 15 illustrates the reduction in amplitude resulting from use of spread spectrum modulation.

For calculating an estimate of the signal reduction in db of the spectral components as shown in FIG. 15, the following formula can be used (in FIG. 15, n=2):

$$\Delta = 20\left(\log\left(\sqrt{\frac{1}{n}}\right)\right)$$

This calculation of signal reduction dB can be used as a minimum estimate for the spectral signal reduction.

For the system of the invention, the spread spectrum frequency modulation is implemented with a digital controller, and is done by shifting in the time domain between a discrete set of carrier frequencies. This is known as frequency-shift-keying (FSK). Using a square wave as shown in FIG. 12 together with FSK leads to a spreading of frequencies and lowering over time of each individually power component, compared to an unmodulated square wave (as can be seen in FIG. 13).

Figure 16:
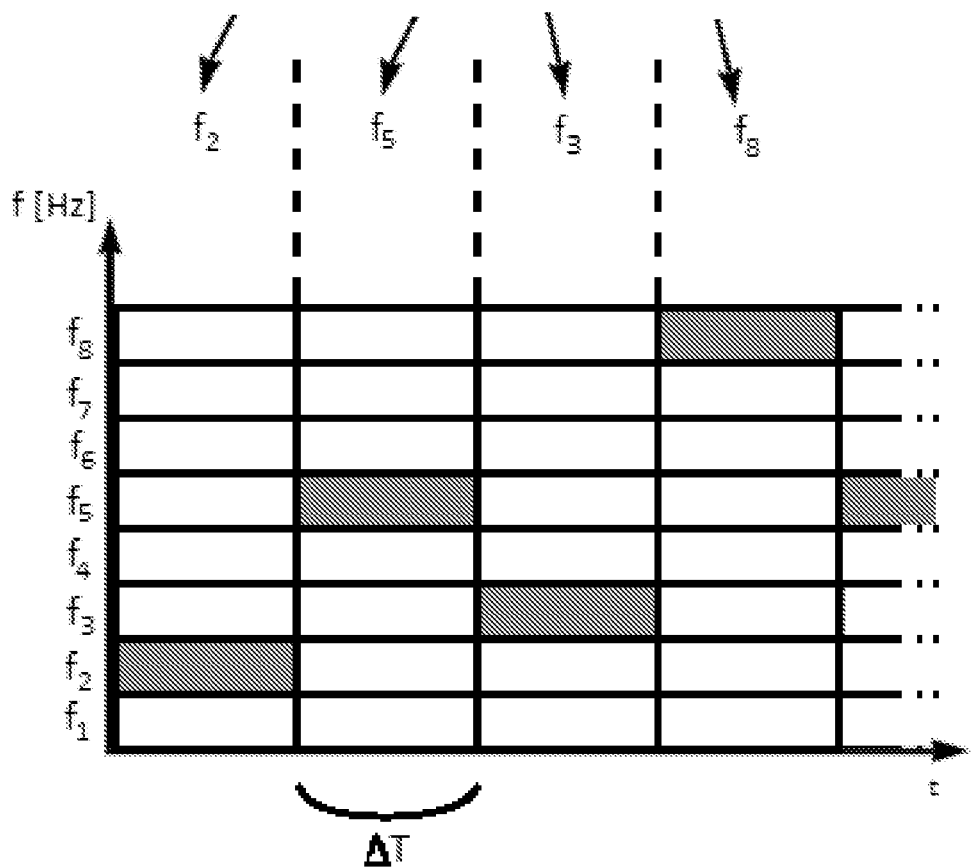
FIG. 16 illustrates an example of Frequency Hopping Spread Spectrum for use with the system of the invention.

Using multiple discrete frequencies leads to a larger spread spectrum bandwidth as well as lowering the power component per discrete frequency. The selection of which carrier frequencies to bounce between using FSK is the spread spectrum effect. This is known as Frequency Hopping Spread Spectrum (FHSS), where the frequency content over a timeline is shown in FIG. 16, with the carrier frequencies (f1, f2 ... f8).

Each carrier frequency is basically the fundamental frequency of a square wave with 50% duty cycle. Accordingly, the time period $\Delta T$ is continuously scaled to fit each carrier frequency, and to avoid an abrupt discontinuity of the modulation (which would result in an unintended generation of high frequency noise). The general type of modulation is called continuous phase frequency keying CPFSK, but is in this case focused on making the phase shift in terms of 0, $2\pi$, $4\pi$, etc. by changing $\Delta T$. This is illustrated in FIG. 17.

Figure 17:
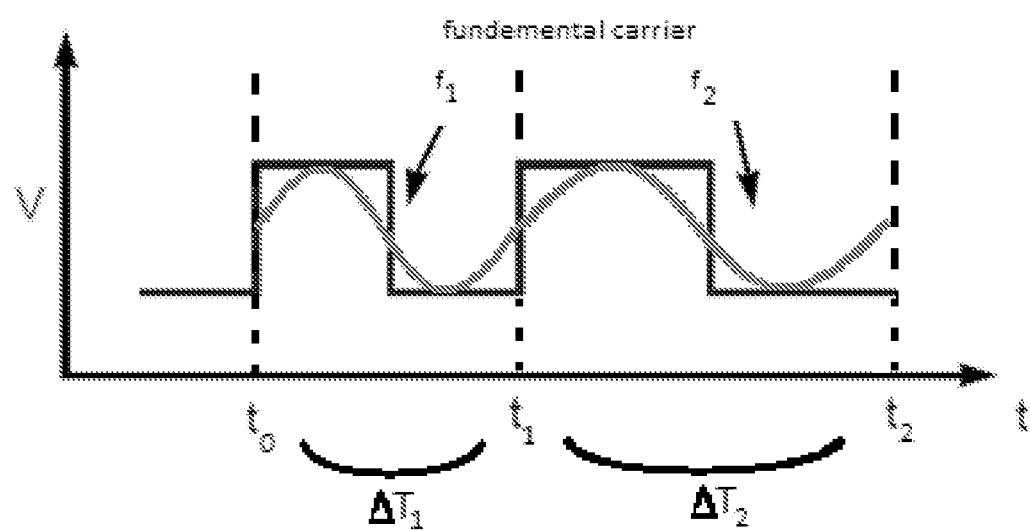
FIG. 17 illustrates an example of Continuous Phase Frequency Shift Keying for use with the system of the invention.
Figure 18:
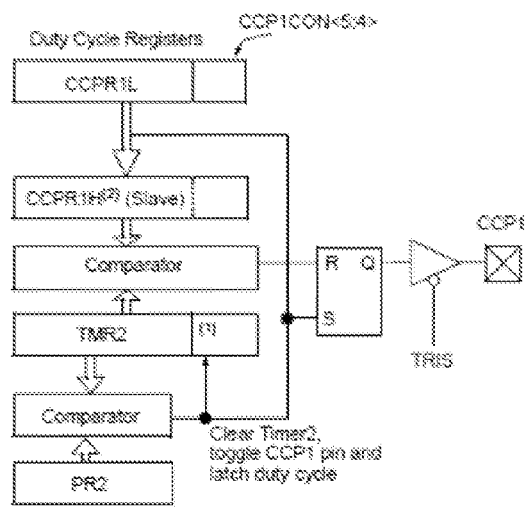
FIG. 18 illustrates the sample interaction of a series of registers of a sample microprocessor for use with the system of the invention.

In practice, changing both the frequency and $\Delta T$ accordingly is done by changing the clock frequency for the PWM outputs every time these have generated a complete cycle of a square wave with 50% duty cycle (as shown in FIG. 17 to time t0, t1 and t2).

The system of the present invention utilises 16 discrete frequencies centred around the main frequency selected from a pseudo random generator based on a linear feedback shift algorithm. This gives the randomness of the selected frequency and ensures EMI reduction. The pseudo random generator implementation allows for dead lock detection and resets the random generator to default state and restarts the random sequence.

Mainloop

One primary operational loop in the microprocessor firmware (i.e. Mainloop 108) is divided into 16 slots or blocks 112 (as seen in FIG. 6). During one loop either a voltage measurement or a current measurement is performed. In the above embodiments, 8 measurements of either voltage or current are needed for one qualified measurement (i.e. the 8 measurements are averaged). At the end of every loop the random sequence is updated, and the next base frequency for the spread spectrum is selected and used in the beginning of the new loop.

The operation of Mainloop 108 now described in relation to the spread spectrum application (the voltage and current measurements are performed in parallel to the spread spectrum application).

A register OSCTUNE is maintained in the microprocessor. The OSCTUNE register allows for the PWM frequency output to be altered in 32 discrete steps, using a two's complement value binary input to the register, where binary 0 is the middle frequency value, binary 15 is the highest frequency, and binary 16 is the lowest frequency. In the illustrated example, the desired PWM centre frequency is 100 kHz, with a 50/50 duty cycle. To achieve this output in a PIC microcontroller, the certain registers of the microprocessor need to be loaded with appropriate values.

Figure 19:
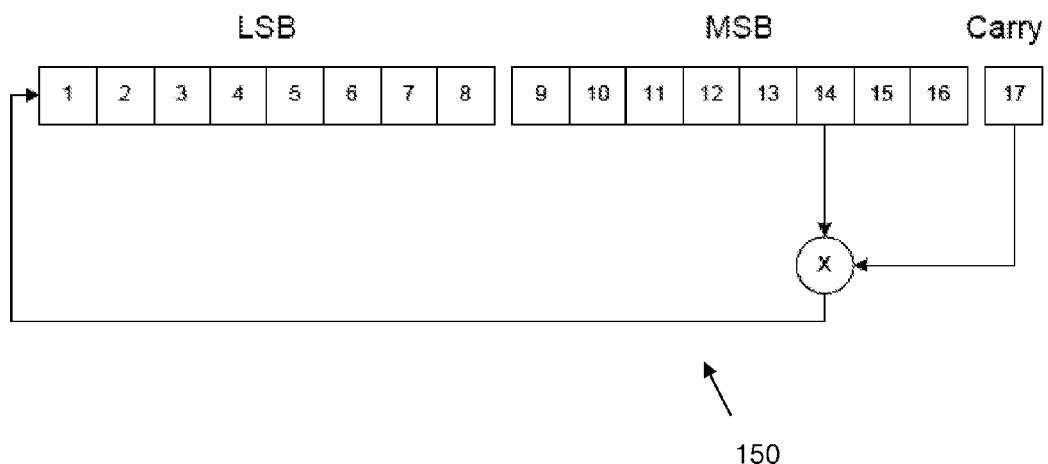
FIG. 19 shows a sample pseudo random generator for use with the system of the invention.

With reference to FIGS. 11 and 19, the configuration for a sample microprocessor used is as follows, where Tosc=1/Fosc, where Fosc is the oscillator frequency for the microprocessor.

TMR2 is an 8 bit timer in the microprocessor, and is used for timing the half H-bridge driver. When operating in PWM mode, two more bits are concatenated to the counter to provide a 10 bit resolution.

PR2 is a register that defines the period of the PWM output. When TMR2 equals PR2, TMR2 resets and starts counting from 0 again.

Registers CCPR1L with CCP1CON<5:4> (Bit4 and Bit5) define the pulse width. This value is compared against TMR2 value (this is done by the microprocessor). Accordingly, $$\text{Period} = \frac{1}{100 \text{ kHz}} = 4(Tosc)(PR2+1)(TMR2prescaleValue)$$

$$\Rightarrow PR2 = \left(\frac{1}{4(100)(10^3)}(8)(10^6)\right) - 1 = 19$$

$$PulseWidth = 4(Tosc)([CCPR1L\langle 7:0\rangle:CCP1CON\langle 5:4\rangle])$$
$$(TMR2prescaleValue)$$
$$= 1/2(\text{Period})$$

$$\Rightarrow [CCPR1L\langle 7:0\rangle:CCP1CON\langle 5:4\rangle] = \frac{1/2(4)(8)(10^6)(20)}{8(10^6)} = 40$$

The delay value is set to the minimum value, as a result the value 1 is written to the PWMCON<6:0> register. The PR2 register is loaded with the value 19, and the CCPR1L register is loaded with 10 (=40/4).

The variation of the PWM frequency due to changes in the OSCTUNE register in this example has been measured, and the variation found to be ±12% for the whole range. The values can be seen in the following table:

TABLE 1

OSCTUNE and frequency output relationship

| Osctune | Freq [kHz] |
|---|---|
| 16 | 88.00 |
| 17 | 88.75 |
| 18 | 89.50 |
| 19 | 90.25 |
| 20 | 91.00 |
| 21 | 91.75 |
| 22 | 92.50 |
| 23 | 93.25 |
| 24 | 94.00 |
| 25 | 94.75 |
| 26 | 95.50 |
| 27 | 96.25 |
| 28 | 97.00 |
| 29 | 97.75 |
| 30 | 98.50 |
| 31 | 99.25 |
| 0 | 100.00 |
| 1 | 100.75 |
| 2 | 101.50 |
| 3 | 102.25 |
| 4 | 103.00 |
| 5 | 103.75 |
| 6 | 104.50 |
| 7 | 105.25 |
| 8 | 106.00 |
| 9 | 106.75 |
| 10 | 107.50 |
| 11 | 108.25 |
| 12 | 109.00 |
| 13 | 109.75 |
| 14 | 110.50 |
| 15 | 111.25 |

It is chosen to narrow the frequency band to the range 94.00 to 105.25 kHz (both inclusive). This gives a total of 16 different frequencies to select from. The OSCTUNE value itself is generated from a pseudo random generator.

Figure 20:
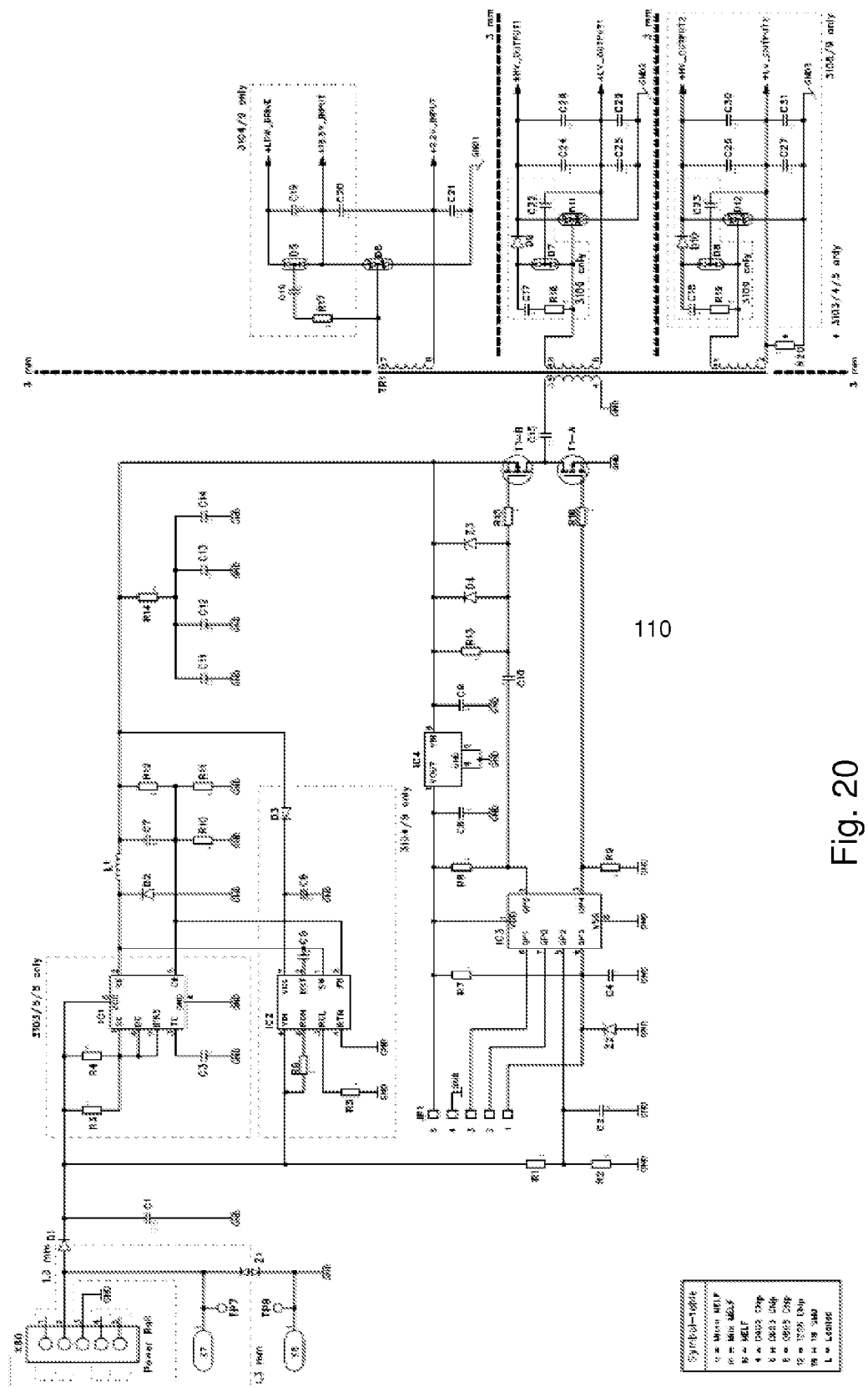
FIG. 20 is a circuit diagram of a complete switched-mode power supply of an embodiment of the invention.

With reference to FIG. 20, the system uses a pseudo random number generator 150 that creates seed values for the PWM frequencies. The 16 blocks 112 of the Mainloop 108 are configured such that one PWM pulse is sent out in each block of Mainloop 108. For each iteration of Mainloop 108, a new seed value is generated by the pseudo random number generator 150, which is used for each of the 16 blocks 112.

The random generator 150 may be of any suitable design, e.g. based on Xilinx application note: "XAPP 052 Jul. 7, 1996 (Version 1.1)". In the embodiment shown, a 17 bit long pseudo random sequence is selected, having a Least Significant Byte (LSB), a Most Significant Byte (MSB), and a Carry bit. As can be seen in FIG. 20, bit 14 and bit 17 of the generator 150 are used to calculate the new bit to be rotated into the 17 bit pseudo random stream (using a simple XOR operation).

A base frequency for the half H-bridge driver is generated for each iteration of Mainloop 108, using the pseudo random number generator 150. The frequency used for the driver signal in each slot 112 of Mainloop 108 is selected as either the base frequency or the adjacent frequency, based on an accumulating value and the corresponding carry from an add operation (based on the seed value of the pseudo random number generated for that cycle of Mainloop 108).

Once a new pseudo random number is generated for an iteration of Mainloop 108, the MSB is used to select the output frequency using the OSCTUNE register.

Bit 13 to bit 16 of the MSB is added to an offset of binary 24, to provide a binary two's complement value in the range between 24 to 7 (with reference to Table 1). This ensures that the OSCTUNE output will be centred around the desired centre frequency of 100 kHz. The binary number provided is entered to the OSCTUNE register, and the resulting output frequency is selected as the Base Frequency for that iteration of Mainloop 108.

In order to provide for further random selection of the switching frequency used, the system is operable to perform an accumulation operation during each slot 112 of Mainloop 108, to determine the actual switching frequency to be used for that slot 112.

The LSB of the pseudo random binary number generated by the pseudo random generator 150 is added in an accumulator in each slot 112 of Mainloop 108, and the output monitored. If the accumulation operation for the slot 112 does not result in a Carry, then the Base Frequency for that iteration of Mainloop 108 is used as the switching frequency for that slot 112, and accordingly is provided as a driving signal to the switching circuit. If the accumulation operation for the slot 112 does produces a Carry, then the switching frequency is selected as a frequency in the OSCTUNE register adjacent to the Base Frequency (e.g. Base Frequency+1).

For example, if the pseudo random sequence for an iteration of Mainloop 108 maps to the OSCTUNE value 2, the Base Frequency for that cycle is 101.50 kHz. In each slot 112 an 8 bit accumulation is performed with the LSB byte part of the random sequence number as an input. If the accumulation gives a carry, OSCTUNE will be updated with its BaseFreq value+1 (in this example it would be 3, and the switching frequency would be 102.25 kHz). If there is no carry from that accumulation step, the BaseFreq number itself is used (i.e. 2, with a switching frequency of 101.50 kHz).

In other embodiments, the accumulation may be performed on the 4 bit value formed by bit 9 to bit 12 of the pseudo random sequence.

While 16 frequencies are selected as possible based frequencies, the further selection of the base frequency or the adjacent base frequency for each of the slots 112 of Mainloop 108 provides an additional granularity, and a further random modulation of the output signal.

An example operation of the frequency selection of Mainloop 108 in pseudo code is as follows:

```
Loop
Slot1
    BaseFreq = NewBaseFreq
    Acc += PR_LSB
    IF Carry THEN use adjacent frequency
    ELSE use BaseFreq
Slot2
    Acc += PR_LSB
    IF Carry THEN use adjacent frequency
    ELSE use BaseFreq
...
...  Slot3 - Slot15, etc.
...
Slot16
    Acc += PR_LSB
    IF Carry THEN use adjacent frequency
    ELSE use BaseFreq
    Update 17 bit random sequence
    Calc NewBaseFreq from pseudo random sequence
    PR_LSB = LSB of 17 bit random sequence
    GOTO Slot1
```

The system may further comprise a deadlock detection unit (not shown), which is operable to monitor the pseudo random generator 150 and to detect if the pseudo random generator 150 enters a deadlock condition. If such a deadlock condition is detected, the system is operable to reset the pseudo random generator 150 and to continue operation of the system.

With reference to FIG. 21, a further embodiment of the system of the invention is illustrated in a circuit diagram.

In summary, the system can operate having three different primary sequences:

Start-up: the voltage is sampled and the half H-bridge driver is not active. 8 samples are averaged and tested against a threshold limit. If the average value is below the threshold this sequence is repeated.

Voltage-loop: the voltage is sampled and 8 samples are averaged and tested against threshold limit. If the average value is below the threshold the half H—bridge driver is stopped and the system enters the start-up sequence.

Current-loop: the current is sampled and 8 samples are averaged. A sliding window of the 16 last averaged values are used to determine if there is too much current draw. If 5 out of the 16 averaged values are above the threshold the system detects this as too much current draw and stops the half H-bridge driver and enters the start-up sequence.

As the controller may be implemented in software in a microprocessor, it will be understood that the implementation allows for several monitoring tasks to be performed in a timeslot based schedule allowing other tasks to be performed in parallel. The software based design allows the threshold limits for the monitoring to be user defined (i.e. flexible and not application specific) and the switching frequency for the half H-bridge driver may be adjustable and accordingly can be tailored for a wide range of transformers used in converter circuits. It will be understood that any suitable microprocessor component may be used in the system, e.g. a PIC12F615 processor.

The system implements user adjustable threshold limits, hysteresis control and power up voltage stability monitoring. By monitoring the start-up voltage the stability of the voltage level can be determined before starting the half H-bridge driver. By implementing hysteresis a stable start-up voltage must be present before starting the half H-bridge.

As the voltage and current monitoring of the system can be carried out in parallel to the spread spectrum modulation, the invention provides the advantage of safe monitoring of the operation of the SMPS, which can be implemented in a SMPS having a relatively simple microprocessor or restricted bandwidth.

The invention is not limited to the embodiment described herein, and may be modified or adapted without departing from the scope of the present invention.

The invention claimed is:

1. A method of controlling a switched-mode power supply, the power supply comprising a switching circuit for receiving a supply voltage and outputting a switched voltage, and a converter circuit coupled to said switching circuit and driven by said switched voltage to produce a required output voltage, the method comprising the steps of:
   providing a driving signal to said switching circuit to regulate the switching frequency of said switching circuit, and
   applying a spread spectrum modulation to said driving signal to reduce electromagnetic interference in the power supply, wherein the method further comprises the steps of:
   monitoring the supply voltage to said switching circuit during operation of said switching circuit, and
   stopping the operation of said switching circuit if said monitored supply voltage falls below an operational voltage threshold value, wherein the method further includes a start-up procedure for starting the operation of said switching circuit comprising:
   monitoring the supply voltage to said switching circuit when said switching circuit is not operational, and
   starting said switching circuit when said monitored supply voltage exceeds a start-up voltage threshold value.

2. The method as claimed in claim 1, wherein said start-up voltage threshold value is greater than said operational voltage threshold value.

3. The method as claimed in claim 1, wherein the step of monitoring comprises:
   sampling a plurality of successive supply voltages,
   averaging said plurality of sampled supply voltages to provide an averaged supply voltage, and
   comparing the averaged supply voltage to a voltage threshold value.

4. The method as claimed in claim 1, wherein the method further comprises the steps of:
   monitoring current flow through said switching circuit during operation of said switching circuit, and
   stopping operation of said switching circuit if said monitored current flow exceeds a flow current threshold value.

5. The method as claimed in claim 4, wherein said power supply comprises a resistor provided in series with said switching circuit, and wherein said current monitoring comprises measuring the current flow through said resistor.

6. The method as claimed in claim 4, wherein said step of current monitoring comprises:
   sampling a plurality of successive current flow values,
   averaging said plurality of sampled current flow values to provide a first averaged current flow, and
   comparing said first averaged current flow value to a current flow threshold value.

7. The method as claimed in claim 4, wherein at least one of said steps of monitoring the operational voltage supply and monitoring current flow are performed in parallel to said step of applying a spread spectrum modulation to said driving signal.

8. The method as claimed in claim 4, wherein said step of applying a spread spectrum modulation to said driving signal comprises the steps of:
   (i) generating a first pseudo random number;
   (ii) selecting a frequency value based on said pseudo random number;
   (iii) providing a driving signal having said selected frequency value;
   (iv) generating a new pseudo random number; and
   (v) repeating steps (ii)-(iv) in a main loop cycle for the duration of operation of the switching circuit.

9. The method as claimed in claim 6, wherein said step of comparing comprises:
   recording a plurality of successive averaged current flow values, and wherein said step of stopping operation of said switching circuit is performed when a predefined number of said plurality of averaged values exceeds said current flow threshold value.

10. The method as claimed in claim 8, wherein said steps (ii) and (iii) are repeated for a plurality of iterations within said main loop cycle.

11. The method as claimed in claim 8, wherein said pseudo random number is a binary number, and wherein step (ii) comprises selecting between a first frequency value and a second frequency value based on an accumulation operation performed on at least a portion of said binary pseudo random number.

12. The method as claimed in claim 8, wherein at least one of said steps of monitoring the operational voltage supply and monitoring current flow are performed in parallel to said steps (ii) and (iii) of said main loop cycle.

13. The method as claimed in claim 8, wherein said power supply comprises a pseudo random generator, and wherein the method further comprises the steps of:
   detecting if the pseudo random generator enters a deadlock condition; and
   resetting the pseudo random generator if a deadlock condition is detected.

14. The method as claimed in claim 12, wherein said step of current monitoring is performed after a predefined number of successive main loop cycles of operational voltage monitoring.

15. A switched-mode power supply comprising:
   a switching circuit for receiving a supply voltage and outputting a switched voltage;
   a converter circuit coupled to said switching circuit and driven by said switched voltage to produce a required output voltage; and
   a controller coupled to said switching circuit, said controller operable to perform the method steps as claimed in claim 1.

* * * * *